(12) United States Patent
Sockwell

(10) Patent No.: US 8,404,164 B2
(45) Date of Patent: Mar. 26, 2013

(54) COMPOSITION FOR PELLETIZED BITUMEN AND METHOD FOR PREPARING THE SAME

(75) Inventor: Kelly Sockwell, Las Vegas, NV (US)

(73) Assignee: Phoenix Industries, LLC, Las Vegas, NV (US)

( * ) Notice: Subject to any disclaimer, the term of this patent is extended or adjusted under 35 U.S.C. 154(b) by 139 days.

(21) Appl. No.: 13/179,232

(22) Filed: Jul. 8, 2011

(65) Prior Publication Data

US 2013/0008348 A1 Jan. 10, 2013

(51) Int. Cl.
*B29B 9/00* (2006.01)

(52) U.S. Cl. .................. 264/117; 106/273.1; 106/281.1; 106/668; 208/23

(58) Field of Classification Search .......................... None
See application file for complete search history.

(56) References Cited

U.S. PATENT DOCUMENTS

| 8,182,726 | B2 * | 5/2012 | Bailey | 264/117 |
| 2009/0272676 | A1 | 11/2009 | Behelfer et al. | |
| 2010/0056669 | A1 | 3/2010 | Bailey | |
| 2011/0196074 | A1 * | 8/2011 | Flanigan | 524/71 |
| 2011/0283920 | A1 * | 11/2011 | Barger et al. | 106/668 |

\* cited by examiner

*Primary Examiner* — Mary F Theisen
(74) *Attorney, Agent, or Firm* — Weiss & Moy, P.C.; Veronica-Adele R. Cao

(57) ABSTRACT

A composition for pelletized bitumen and a method for preparing the same is disclosed. The composition is comprised of: between approximately 30% to approximately 40% by weight of bitumen; between approximately 15% to approximately 30% by weight of stiffening compound; between approximately 35% to approximately 45% by weight of setting compound; and approximately 0.05% by weight of water. The stiffening compound is comprised of between approximately 10% to approximately 20% by weight of ground asphalt shingles; between approximately 5% to approximately 10% by weight of vulcanized rubber; between approximately 1% to approximately 2% by weight of uintahite; and up to approximately 0.5% by weight of zeolite. And the stiffening compound may be Type II Portland cement.

18 Claims, 2 Drawing Sheets

COMPOSITION FOR PELLETIZED BITUMEN AND METHOD FOR PREPARING THE SAME

FIELD OF THE INVENTION

The invention relates generally to asphalt, and more specifically to a composition for pelletized bitumen and a method for preparing the pelletized bitumen.

BACKGROUND OF THE INVENTION

Bitumen, also known as asphalt or tar, is a black, oily, viscous material that is a naturally-occurring organic byproduct of decomposed organic materials. Liquid bitumen is typically transported via barges, rail, and trucks.

Shipping liquid bitumen by barge is advantageous because of its relatively low costs. But, keeping the liquid bitumen at the correct temperature during transport is a major concern. Also, the disadvantages of transporting liquid bitumen by barge are the limited availability of locations where waterways are available and the susceptibility to delays due to weather conditions.

Transporting liquid bitumen by rail is also common, but the delivery temperature of the liquid bitumen directly affects unloading time and their heating costs. The rail cars are not heated during transport and depending upon the length of travel time and the ambient temperature, the railcars may require reheating upon arrival. If the liquid bitumen has cooled to ambient temperature, it may take up to 24 hours to reheat the liquid bitumen so that it may be unloaded.

The most common means for transporting liquid bitumen is by truck, because it offers the most control over delivery time. At a mixing plant, the liquid bitumen is expected to be delivered at the desired mixing temperature because heating the liquid bitumen results in delays and adds to production costs. Some tanker trailers may be equipped with heaters, to keep the liquid bitumen at a certain temperature. But these heaters are usually burners that run on diesel oil, which therefore adds to transportation costs.

The present invention is directed to composition for pelletized bitumen and a method for preparing the pelletized bitumen. In this pelletized form, bitumen may be transported without having to be heated, thereby reducing transportation costs. Other compositions for pelletized asphalt have been used, but none of the previous asphalt pellets have been able to maintain their integrity when stored in extremely hot temperatures.

SUMMARY OF THE INVENTION

In accordance with one embodiment of the present invention a composition for pelletized bitumen is disclosed. The composition comprises: between approximately 30% to approximately 40% by weight of bitumen; between approximately 15% to approximately 30% by weight of stiffening compound; between approximately 35% to approximately 45% by weight of setting compound; and approximately 0.05% by weight of water.

In accordance with another embodiment of the present invention, a composition for pelletized bitumen is disclosed. The composition comprises: between approximately 30% to approximately 40% by weight of bitumen; between approximately 15% to approximately 30% by weight of stiffening compound; between approximately 35% to approximately 45% by weight of setting compound; and approximately 0.05% by weight of water; wherein the approximately 15% to approximately 30% by weight of stiffening compound comprises: between approximately 10% to approximately 20% by weight of ground asphalt shingles; between approximately 5% to approximately 10% by weight of vulcanized rubber; between approximately 1% to approximately 2% by weight of uintahite; and up to approximately 0.5% by weight of zeolite.

In accordance with another embodiment of the present invention, a method for preparing pelletized bitumen is disclosed. The method comprises the steps of: blending liquid bitumen and stiffening compound together within a blending unit to create a liquid bitumen mixture; blending setting compound with the liquid bitumen mixture to create bitumen pellets; cooling the bitumen pellets; and setting the bitumen pellets.

The foregoing and other objects, features, and advantages of the invention will be apparent from the following, more particular description of the preferred embodiments of the invention, as illustrated in the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
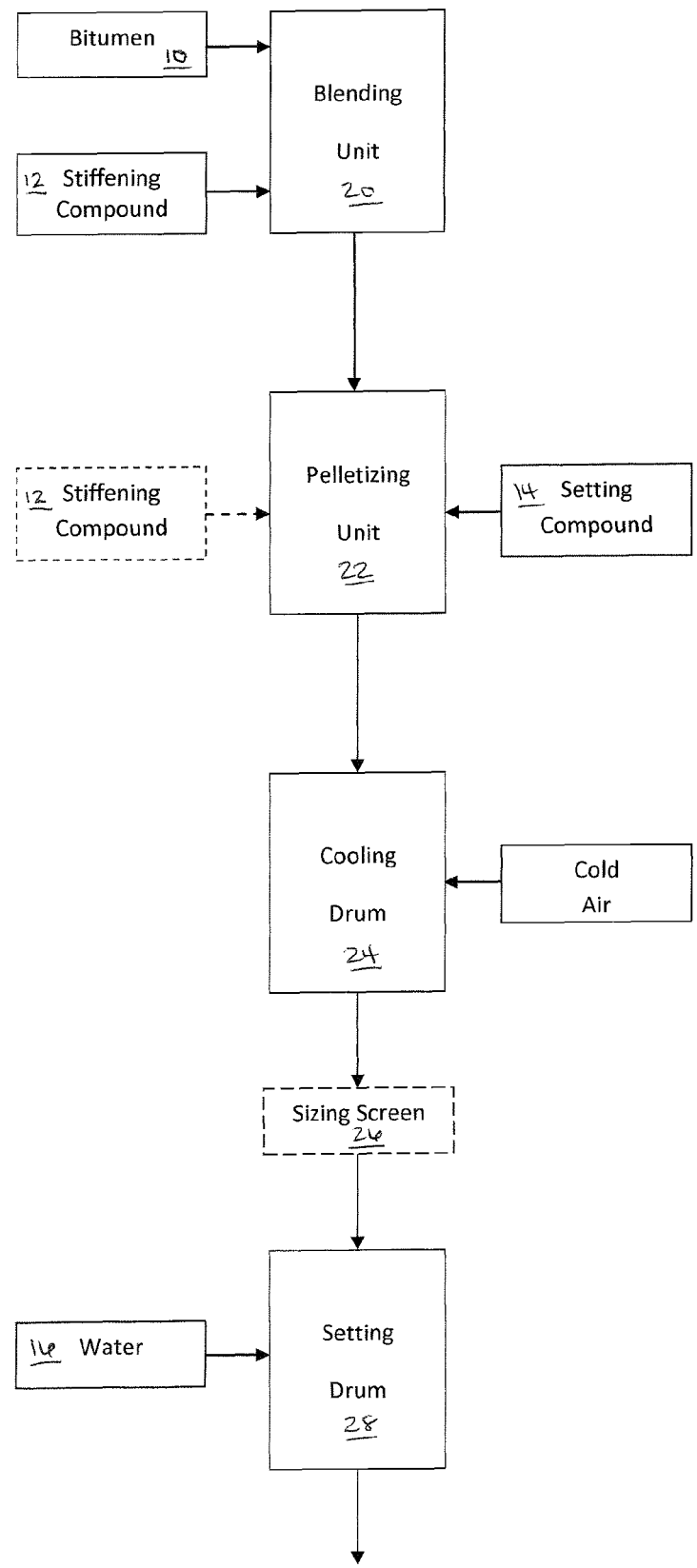
FIG. 1 is a simplified functional block diagram of the method of processing pelletized bitumen according to one or more embodiments of the present invention.
Figure 2:
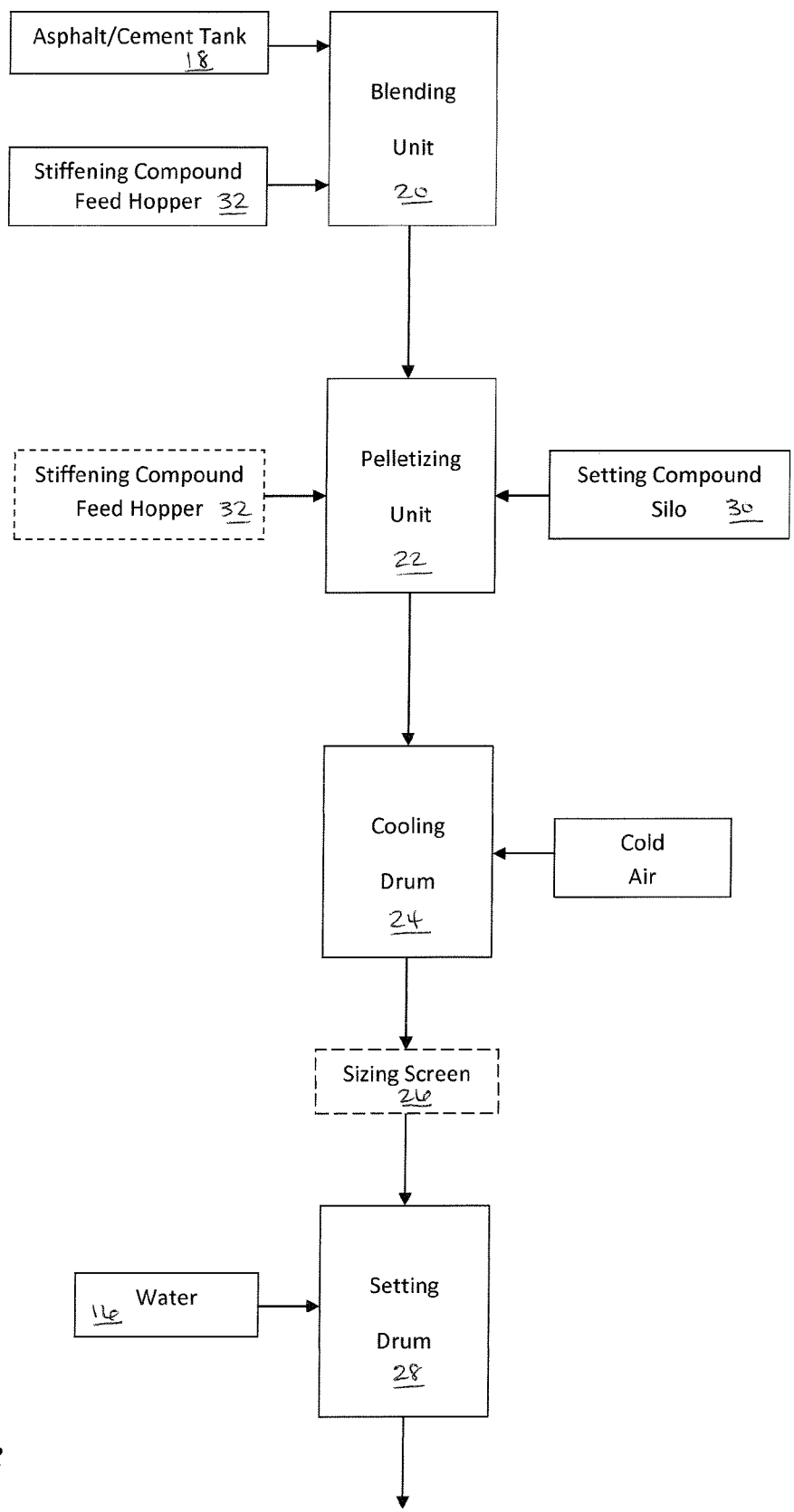
FIG. 2 is a simplified functional block diagram of the system for processing pelletized bitumen according to one or more embodiments of the present invention.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

Unlike the compositions for pelletized asphalt that are disclosed by Behelfer et al. (U.S. Pub. No. 2010/0056669) or Bailey (U.S. Pub. No. 2009/0272676), the composition of the present invention allows for pelletized bitumen to be stored in extremely hot temperatures. In areas such as Nevada or Arizona, where temperatures may rise up to 115° F. and higher, the pellet compositions of the Behelfer et al. and Bailey patent applications have proven to be inadequate because the extreme heat causes the pellets to melt and stick together, forming large globular masses.

A composition for pelletized bitumen in accordance with the present invention may comprise bitumen 10, a stiffening compound 12, a setting compound 14, and water 16.

To begin the process of pelletizing bitumen, the liquid bitumen 10 should be maintained at a controlled temperature between about 225° F. to about 425° F. It is preferred that the temperature of the liquid bitumen 10 be approximately 325° F., but it should be clearly understood that further substantial benefit may also be derived from the liquid bitumen 10 being kept at any temperature within the desired range. The liquid bitumen 10 may be held in an asphalt/cement tank 18 that is connected to a blending unit 20. However it should be clearly understood that the liquid bitumen 10 may also delivered into the blending unit 20 directly from an oil transport truck, or any other suitable mode of transportation, that may be connected to the blending unit 20. An example of a blending unit 20 that may be used in this process is the Phoenix Industries AR 150M Asphalt Rubber Blending Unit, however it should be clearly understood that any other suitable blending unit may be used.

Stiffening compound 12 is then delivered into the blending unit 20 via a feed hopper 32, or other suitable delivery mechanism, and is blended with the liquid bitumen 10 within the blending unit 20. In one example, stiffening compound 12 in an amount between approximately 15% to approximately 30% by weight of the total bitumen pellet is combined with liquid bitumen 10 in an amount between approximately 30% to approximately 40% by weight of the total bitumen pellet. The stiffening compound 12 may comprise ground asphalt shingles in an amount between approximately 10% to approximately 20% by weight of the total bitumen pellet; vulcanized rubber in an amount between approximately 5% to approximately 10% by weight of the total bitumen pellet; uintahite in an amount between approximately 1% to approximately 2% by weight of the total bitumen pellet; and zeolite in an amount up to approximately 0.5% by weight of the total bitumen pellet. The components of the stiffening compound 12 may be added separately to the liquid bitumen 10 in the blending unit 20 or some of the components of the stiffening compound 12 may first be combined to form a partial pre-mixture. For example, the ground asphalt shingles, uintahite, and zeolite components of the stiffening compound 12 may be combined ahead of time to form a partial pre-mixture. The partial pre-mixture (of ground asphalt shingles, uintahite, and zeolite) may then be added to the blending unit 20 while the vulcanized rubber component of the stiffening compound 12 is added separately to the blending unit 20.

The ground asphalt shingles may be produced from recycled roof asphalt shingles and the vulcanized rubber may be crumb rubber produced from recycled scrap tires, but it should be clearly understood that further substantial benefit may be derived from other suitable forms and sources of asphalt shingles and vulcanized rubber. Uintahite is a black, glasslike, soft asphaltite found only in Utah and West Colorado. Applicant notes that the amounts of the stiffener compound 12 components may be varied in order to cut down on the more expensive components. For example, more ground asphalt shingles and zeolite may be used in order to cut down on the need for the more expensive uintahite.

The liquid bitumen mixture (containing bitumen 10 and stiffening compound 12) is then delivered from the blending unit 20 into a pelletizing unit 22. Setting compound 14 is then blended with the liquid bitumen mixture (containing bitumen 10 and stiffening compound 12) in the pelletizing unit 22. In one embodiment, setting compound 14 in an amount between approximately 35% to approximately 45% by weight of the total bitumen pellet is combined with the liquid bitumen mixture. In one embodiment, the setting compound 14 may be Type II Portland cement. The typical compound composition of Type II Portland cement is: 51% ($C_3S$), 24% ($C_2S$), 6% ($C_3A$), 11% ($C_4AF$), 2.9% MgO, 2.5% ($SO_3$), 0.8% Ignition loss, and 1.0% free CaO. It should be clearly understood that further substantial benefit may derived from another similar cement mixture. The setting compound 14 may be stored in a silo 30, or any other suitable storage unit, that is connected to the pelletizing unit 22.

The liquid bitumen mixture, while in the pelletizing unit 22, is then dusted with dry setting compound 14, which causes the liquid bitumen mixture to form into bitumen pellets (containing bitumen 10, stiffening compound 12, and setting compound 14). The setting compound 14 is not only blended into the liquid bitumen mixture (thereby forming a part of the body of the bitumen pellet), but the setting compound 14 also forms a thin layer on the outer surface of the bitumen pellet.

In one embodiment, the entire amount of each component of the stiffening compound 12 would be combined with the liquid bitumen 10 only in the blending unit 20. In other words, all of the ground asphalt shingles, all of the vulcanized rubber, all of the uintahite, and all of the zeolite used in the stiffening compound 12 would be blended with liquid bitumen 10 in the blending unit 20. In another embodiment of the invention, a portion of the stiffening compound 12 may be first introduced into the liquid bitumen 10 within the blending unit 20 and then the remaining portion of the stiffening compound 12 may subsequently be added to the liquid bitumen mixture in the pelletizing unit 22. For example, up to about half of the total amount of ground asphalt shingles used for the stiffening compound 12 may be added into the blending unit 20 (along with the total amount of vulcanized rubber, the total amount of uintahite, and the total amount of zeolite used for the stiffening compound 12) and the remainder of the total amount of ground asphalt shingles used for the stiffening compound 12 may be added into the pelletizing unit 22 (along with the setting compound 14).

The speed and the pitch of the pelletizing unit 22 may be adjusted in order to control the size of the resulting bitumen pellets. For example, the pelletizing unit 22 may be run at a speed of 45 rpm and a pitch of 40 degrees to produce bitumen pellets between approximately 0.25 inch to approximately 2 inches in diameter. By the time the bitumen 10 has been formed into pellets, the temperature of the bitumen 10 may drop from about 325° F. to about 180° F.

The bitumen pellets may then be delivered to a cooling drum 24. The cooling drum 24 may be positioned at an angle and rotated while cold air is pumped through it. The bitumen pellets may harden as they are passed through the cooling drum 24. Upon exiting the cooling drum 24, the temperature of the bitumen pellets may have dropped from about 180° F. to about 75° F.

After exiting the cooling drum 24, the bitumen pellets may be separated according to size by a sizing screen 26, or series of sizing screens 26. The sizing screen 26 may have holes of a certain desired size. As bitumen pellets are conveyed over the sizing screen 26, any bitumen pellets that are smaller than the holes will fall below through the holes of the sizing screen 26.

In one embodiment, two sizing screens 26 may be used. The first sizing screen 26 may be positioned above a second sizing screen 26 and below the second sizing screen 26 there may be a conveyor belt or collection area. The holes of the first sizing screen 26 may be 1¼ inch, therefore allowing bitumen pellets smaller than approximately 1 inch to fall through the holes and onto the second sizing screen 26. The holes of the second sizing screen 26 may be 5/16 inch, therefore allowing bitumen pellets smaller than approximately ¼ inch to fall through the holes of the second sizing screen 26 and onto the conveyor belt below or collection area below. The bitumen pellets that remain on the first sizing screen 26 may then be cooled, ground into smaller pieces, and reintroduced into the pelletizing unit 22. The bitumen pellets that fall through the first sizing screen 26 and remain on the second sizing screen 26, would be the preferred size of between approximately ⅜ inch to approximately 1 inch, and may then be collected and prepared for storage or shipping. The bitumen pellets that fall through the first sizing screen 26 and also fall through the second sizing screen 26 may then be immediately reintroduced into the pelletizing unit 22. It should be clearly understood that further substantial benefit may be derived from the bitumen pellets that are not separated according to size.

The bitumen pellets may then be passed through a setting drum 28. As the bitumen pellets pass through the setting drum 28, they are sprayed with water 16. The water 16 reacts with the thin layer of setting compound 14 that had formed on the outer surface of the bitumen pellets. The water 16 causes the setting compound 14 to become crystallized. It is this crystallized outer surface of the bitumen pellets that prevents the bitumen pellets from melting, sticking together, and forming large globular masses when stored in areas of extremely hot weather temperatures.

The following is an example of a composition for pelletized bitumen, wherein all of the stiffener compound 12 is blended with the liquid bitumen 10 within the blending unit 20:

EXAMPLE 1

| Component | % by weight of total bitumen pellet composition |
|---|---|
| Bitumen | 37.50 |
| Ground Asphalt Shingles | 14.40 |
| Vulcanized Rubber | 6.80 |
| Uintahite | 1.70 |
| Zeolite | 0.30 |
| Type II Portland Cement | 39.25 |
| Water | .05 |

The following is an example of a composition for pelletized bitumen, wherein a portion of the stiffener compound 12 is blended with the liquid bitumen 10 within the blending unit 20 and then the remainder of the stiffener compound 12 is blended with the liquid bitumen mixture within the pelletizing unit 22. This example also includes the site at which the particular component is introduced into the composition for pelletized bitumen.

EXAMPLE 2

| Component | % by weight of total bitumen pellet composition | Site |
|---|---|---|
| Bitumen | 37.50 | Blending Unit |
| Ground Asphalt Shingles | 7.20 | Blending Unit |
| Vulcanized Rubber | 6.80 | Blending Unit |
| Uintahite | 1.70 | Blending Unit |
| Zeolite | 0.30 | Blending Unit |
| Type II Portland Cement | 39.25 | Pelletizing Unit |
| Ground Asphalt Shingles | 7.20 | Pelletizing Unit |
| Water | .05 | Setting Drum |

While the invention has been particularly shown and described with reference to preferred embodiments thereof, it will be understood by those skilled in the art that the foregoing and other changes in form and details may be made therein without departing from the spirit and scope of the invention. For example, although the composition examples are provided above, it should be clearly understood that substantial benefit may be derived even if the composition of the bitumen pellets vary within the disclosed ranges.

I claim:

1. A composition for pelletized bitumen comprising:
   between approximately 30% to approximately 40% by weight of bitumen;
   between approximately 15% to approximately 30% by weight of stiffening compound;
   between approximately 35% to approximately 45% by weight of setting compound; and
   approximately 0.05% by weight of water.

2. The composition of claim 1 wherein the composition is composed of:
   approximately 37.5% by weight of bitumen;
   approximately 23.2% by weight of stiffening compound;
   approximately 39.25% by weight of setting compound; and
   approximately 0.05% by weight of water.

3. The composition of claim 1 wherein the stiffening compound comprises:
   between approximately 10% to approximately 20% by weight of ground asphalt shingles;
   between approximately 5% to approximately 10% by weight of vulcanized rubber;
   between approximately 1% to approximately 2% by weight of uintahite; and
   up to approximately 0.5% by weight of zeolite.

4. The composition of claim 1 wherein the stiffening compound is composed of:
   approximately 14.4% by weight of ground asphalt shingles;
   approximately 6.8% by weight of vulcanized rubber;
   approximately 1.7% by weight of uintahite; and
   approximately 0.3% by weight of zeolite.

5. The composition of claim 1 wherein the setting compound is Type II Portland cement.

6. A composition for pelletized bitumen comprising:
   between approximately 30% to approximately 40% by weight of bitumen;
   between approximately 15% to approximately 30% by weight of stiffening compound;
   between approximately 35% to approximately 45% by weight of setting compound; and
   approximately 0.05% by weight of water;
   wherein the approximately 15% to approximately 30% by weight of stiffening compound comprises:
     between approximately 10% to approximately 20% by weight of ground asphalt shingles;
     between approximately 5% to approximately 10% by weight of vulcanized rubber;
     between approximately 1% to approximately 2% by weight of uintahite; and
     up to approximately 0.5% by weight of zeolite.

7. The composition of claim 6 wherein the composition is composed of:
   approximately 37.5% by weight of bitumen;
   approximately 23.2% by weight of stiffening compound;
   approximately 39.25% by weight of setting compound; and
   approximately 0.05% by weight of water.

8. The composition of claim 7 wherein the stiffening compound is composed of:
   approximately 14.4% by weight of ground asphalt shingles;
   approximately 6.8% by weight of vulcanized rubber;
   approximately 1.7% by weight of uintahite; and
   approximately 0.3% by weight of zeolite.

9. The composition of claim 6 wherein the setting compound is Type II Portland cement.

10. A method for pelletizing bitumen comprising the steps of:
- blending liquid bitumen and stiffening compound together within a blending unit to create a liquid bitumen mixture;
- blending setting compound with the liquid bitumen mixture to create bitumen pellets;
- cooling the bitumen pellets; and
- setting the bitumen pellets.

11. The method of claim 10 wherein the step of blending liquid bitumen and stiffening compound together comprises the steps of:
- providing approximately 37.5% by weight of liquid bitumen into the blending unit; and
- providing approximately 23.2% by weight of stiffening compound into the blending unit to mix with the liquid bitumen.

12. The method of claim 10 wherein the stiffening compound comprises:
- between approximately 10% to approximately 20% by weight of ground asphalt shingles;
- between approximately 5% to approximately 10% by weight of vulcanized rubber;
- between approximately 1% to approximately 2% by weight of uintahite; and
- up to approximately 0.5% by weight of zeolite.

13. The method of claim 12 wherein the step of blending liquid bitumen and stiffening compound together further comprises the step of:
- creating a partial pre-mixture of the ground asphalt shingles, the uintahite, and the zeolite components of the stiffening compound;
- providing the partial pre-mixture into the blending unit to mix with the liquid bitumen; and
- providing the vulcanized rubber component into the blending unit to mix with the liquid bitumen.

14. The method of claim 10 wherein the step of blending setting compound with the liquid bitumen mixture comprises the steps of:
- providing the liquid bitumen mixture into a pelletizing unit; and
- providing approximately 39.25% by weight setting compound into the pelletizing unit to mix with the liquid bitumen.

15. The method of claim 14 wherein the setting compound is Type II Portland cement.

16. The method of claim 10 further comprising the step of separating bitumen pellets according to pellet size by passing the bitumen pellets through a sizing screen.

17. The method of claim 10 wherein the step of setting the bitumen pellets comprises the steps of:
- providing the bitumen pellets into a setting drum; and
- spraying the bitumen pellets with approximately 0.05% by weight of water to harden the setting compound present on an outer surface of the bitumen pellets.

18. The method of claim 14 further comprising the step of:
- blending a first portion of the stiffening compound together with the liquid bitumen within the blending unit; and
- blending a remaining portion of the stiffening compound together with the liquid bitumen mixture and the setting compound within the pelletizing unit.

* * * * *